(12) United States Patent
Chen et al.

(10) Patent No.: US 9,000,739 B2
(45) Date of Patent: Apr. 7, 2015

(54) SOFT-START VOLTAGE REGULATING CIRCUIT AND GENERATOR VOLTAGE REGULATING SYSTEM THEREOF

(71) Applicants: Universal Scientific Industrial (Shanghai) Co., Ltd., Shanghai (CN); Universal Global Scientific Industrial Co., Ltd., Caotun Township, Nantou County (TW)

(72) Inventors: Jeffrey Chen, Caotun Township, Nantou County (TW); Sam Huang, Caotun Township, Nantou County (TW); Dean Wu, Caotun Township, Nantou County (TW); Louis Huang, Caotun Township, Nantou County (TW)

(73) Assignees: Universal Scientific Industrial (Shanghai) Co., Ltd., Shanghai (CN); Universal Global Scientific Industrial Co., Ltd., Caotun Township, Nantou County (TW)

( * ) Notice: Subject to any disclaimer, the term of this patent is extended or adjusted under 35 U.S.C. 154(b) by 85 days.

(21) Appl. No.: 13/791,060

(22) Filed: Mar. 8, 2013

(65) Prior Publication Data
US 2014/0125295 A1    May 8, 2014

(30) Foreign Application Priority Data
Nov. 2, 2012    (TW) .............................. 101140852 A (51) Int. Cl.
G05F 1/40    (2006.01)
H02P 9/08    (2006.01)
H02P 9/10    (2006.01)

(52) U.S. Cl.
CPC . *H02P 9/08* (2013.01); *H02P 9/102* (2013.01)

(58) Field of Classification Search
USPC ............ 323/234, 237, 238, 321, 901; 363/49
See application file for complete search history.

(56) References Cited

U.S. PATENT DOCUMENTS

| | | | | |
|---|---|---|---|---|
| 4,180,852 A | * | 12/1979 | Koizumi et al. | 363/49 |
| 5,490,054 A | * | 2/1996 | Hanebrink, Jr. | 363/21.09 |
| 6,611,130 B2 | * | 8/2003 | Chang | 323/235 |
| 6,906,933 B2 | * | 6/2005 | Taimela | 363/37 |
| 7,372,210 B2 | * | 5/2008 | Scolaro et al. | 315/209 R |
| 8,482,948 B2 | * | 7/2013 | Chen | 363/72 |
| 2013/0194698 A1 | * | 8/2013 | Sase et al. | 360/75 |

* cited by examiner

*Primary Examiner* — Adolf Berhane
(74) *Attorney, Agent, or Firm* — Muncy, Geissler, Olds & Lowe, P.C.

(57) ABSTRACT

A soft-start circuit composed of active components and passive components and a soft-start voltage regulator based on this soft-start circuit are disclosed. The soft-start voltage regulator is coupled to a generator, a battery and a starter. When the starter is started, the soft-start voltage regulator receives the voltage of the battery to generate a soft-start signal, enabling the generator to establish a voltage. Further, after the generator established the voltage, the soft-start voltage regulator is shut off and the soft-start signal is outputted.

19 Claims, 8 Drawing Sheets

SOFT-START VOLTAGE REGULATING CIRCUIT AND GENERATOR VOLTAGE REGULATING SYSTEM THEREOF

BACKGROUND OF THE INVENTION

1. Field of the Invention

The present invention relates to voltage control technology and more particularly, to a soft-start voltage regulating circuit composed of active components and passive components. The invention relates also to a generator voltage regulating system using the soft-start voltage regulating circuit.

2. Description of the Related Art

Figure 1:
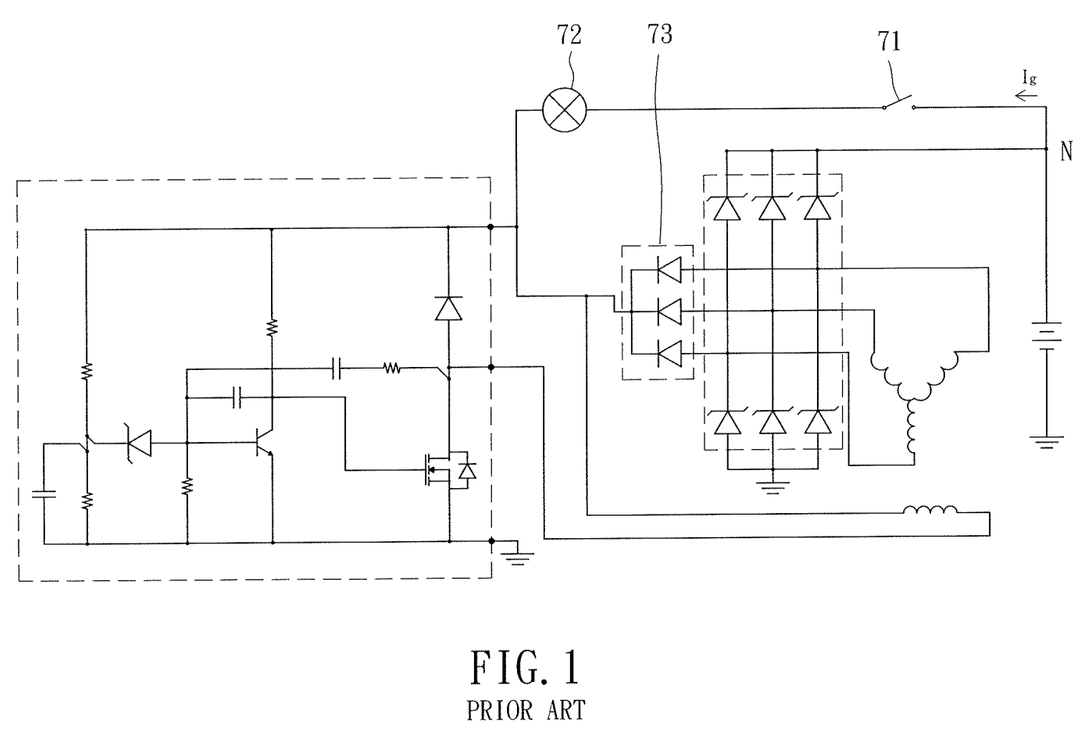
FIG. 1 is a circuit diagram of a trio diode-included pre-excitation circuit accordance to the prior art.

During running of a car, the desired electric power is supplied by a generator. If the generator is not yet started, the stator and excitation coil of the generator have no electric current passing therethrough and do not generate power supply. It is necessary to provide current to the excitation coil to cause the stator to work, enabling the generator to generate power supply. Generator excitation current source and control method can be achieved through a pre-excitation circuit. Some known pre-excitation circuits include a trio diode. Some other known pre-excitation circuits do not include a trio diode. FIG. 1 illustrates a trio diode-included pre-excitation circuit according to the prior art. According to this design, before running of the generator, excitation current Ig goes from node N to conduct a start switch 71 and an indicator light 72. This means that excitation current Ig comes from the start switch 71. After the generator has been started to establish voltage, excitation current Ig goes through a trio diode 73 to provide the necessary current.

Figure 2:
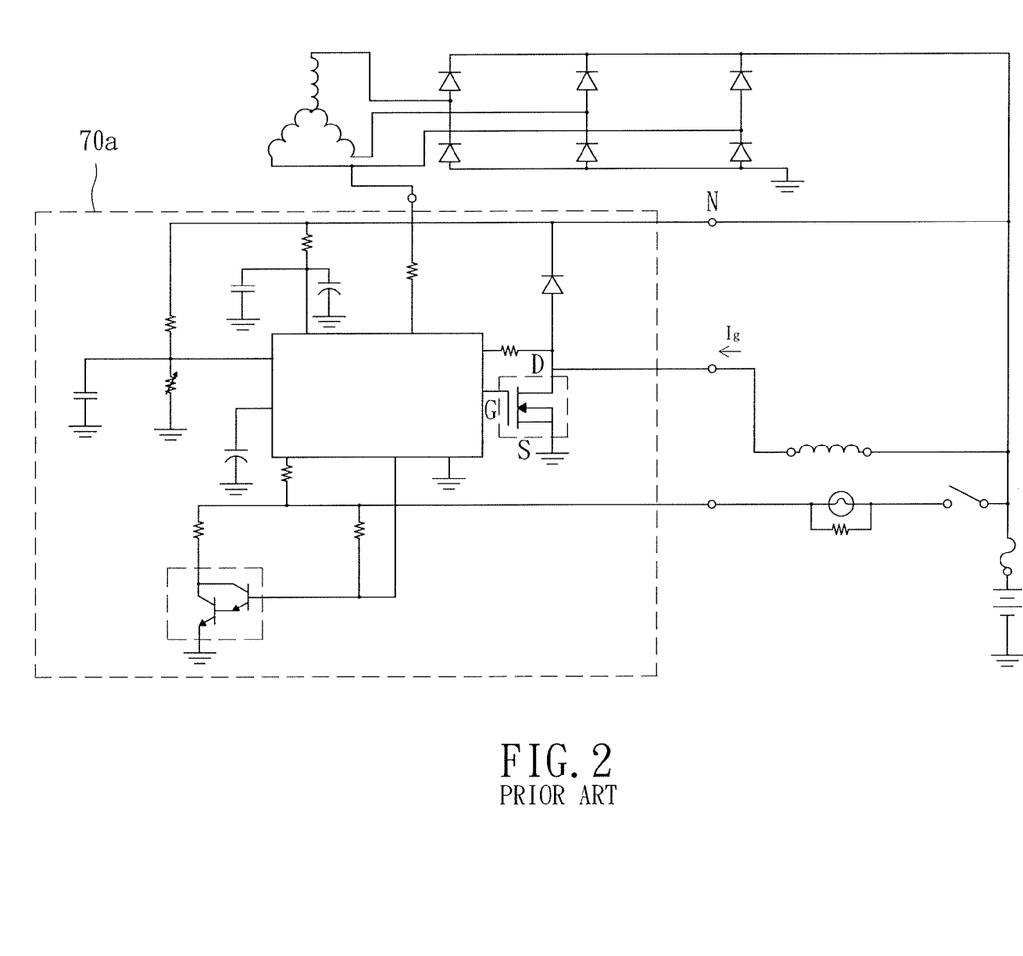
FIG. 2 is a circuit diagram of a trio diode-excluded pre-excitation circuit accordance to the prior art.
Figure 3:
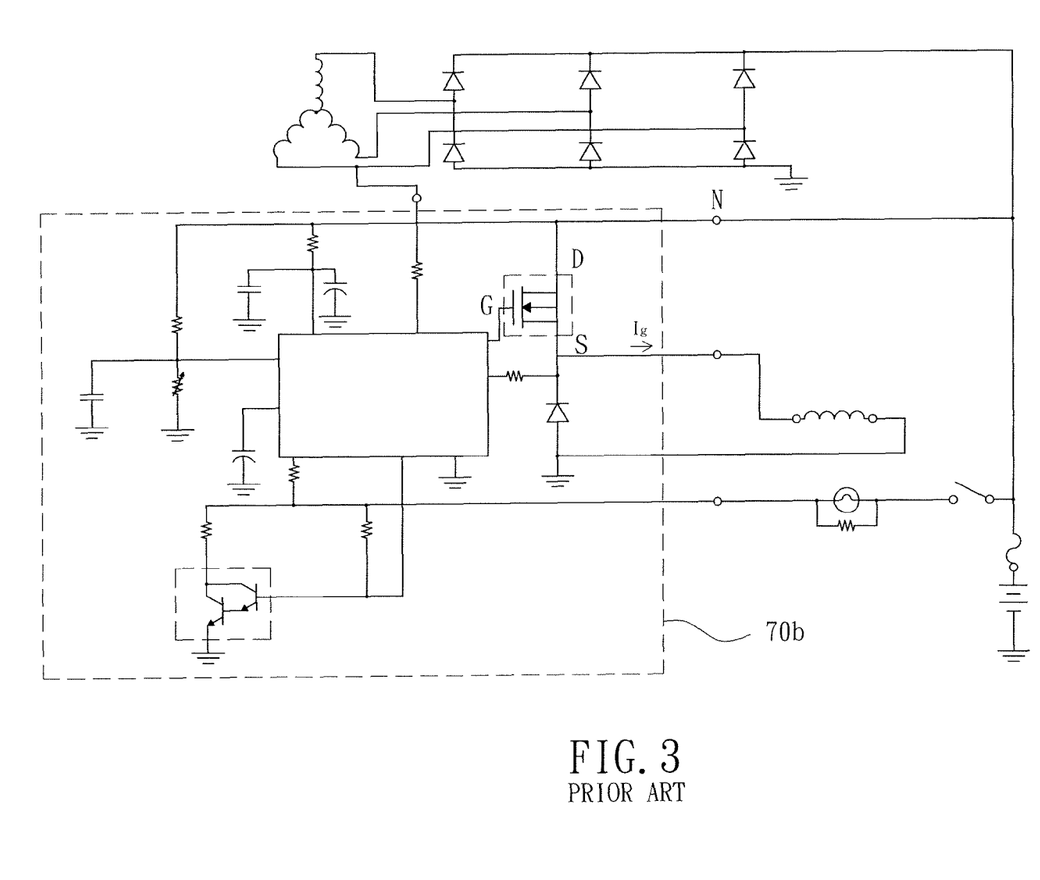
FIG. 3 corresponds to FIG. 2, illustrating another operation status of the diode-excluded pre-excitation circuit.

FIGS. 2 and 3 illustrate a trio diode-excluded pre-excitation circuit according to the prior art. The circuits 70a and 70b are made by integrated circuit (IC) in the prior art, and the duty cycle is fixed at a specific value during IC manufacturing, for example, 12%, 18% or 30%. The IC design and manufacturing lacks of adjustment flexibility of duty cycle, besides, the cost for developing specific duty cycle of the integrated circuit is high.

Therefore, it is desirable to provide a soft-start circuit design, which provides adjustment flexibility on duty cycle and reduces the circuit manufacturing cost.

SUMMARY OF THE INVENTION

The present invention has been accomplished under the circumstances in view. It is the main object of the present invention to provide a soft-start circuit, which comprises a voltage regulator adapted for generating an operating voltage, and an astable multivibrator unit coupled to the voltage regulator and adapted for receiving the operating voltage to oscillate a soft-start signal. The soft-start circuit is composed of active components and passive components. The cost of the soft-start circuit is cheaper than the prior art integrated circuit design. By means of changing the value of the active components or the passive components, different duty cycle can be achieved. Further, based on this active and passive components design, the adjustment range of duty cycle of the present invention is much wider than the integrated circuit design.

It is another object of the present invention to provide a soft-start voltage regulator using the soft-start circuit and a generator voltage regulating system using the soft-start voltage regular, achieving zero leakage current when the car stalled.

The soft-start voltage regulator provided by the present invention is coupled to a generator, a battery and a starter. The soft-start voltage regulator comprises a first detection circuit, a second detection circuit, a soft-start circuit, a regulator circuit, an excitation driver and a power management circuit. The first detection circuit is adapted to monitor the starter, and to generate a first signal when the starter is started. The second detection circuit is adapted to monitor the generator, and to generate a second signal after the generator established a voltage. The regulator circuit is coupled to the soft-start circuit. The excitation driver is coupled to the regulator circuit. The power management circuit is coupled to the first detection circuit, the second detection circuit and the soft-start circuit, comprising a power supply terminal coupled to the battery and the generator. When the power management circuit receives the first signal, the power supply terminal provides the voltage to the soft-start circuit to generate a soft-start signal that is transmitted through the regulator circuit to the excitation driver for causing the generator to establish a voltage. When the power management circuit receives the second signal, the power management circuit shuts off the soft-start circuit, and the voltage of the power supply terminal is provided to the regulator circuit to control the excitation driver.

Preferably, the astable multivibrator unit comprises two transistors, a first resistor-capacitor circuit and a second resistor-capacitor circuit. The first resistor-capacitor circuit and the second resistor-capacitor circuit are adapted to receive the operating voltage for the working of the two transistors.

Other and further benefits, advantages and features of the present invention will be understood by reference to the following specification in conjunction with the accompanying drawings, in which like reference characters denote like elements of structure.

DETAILED DESCRIPTION OF THE INVENTION

Figure 4:
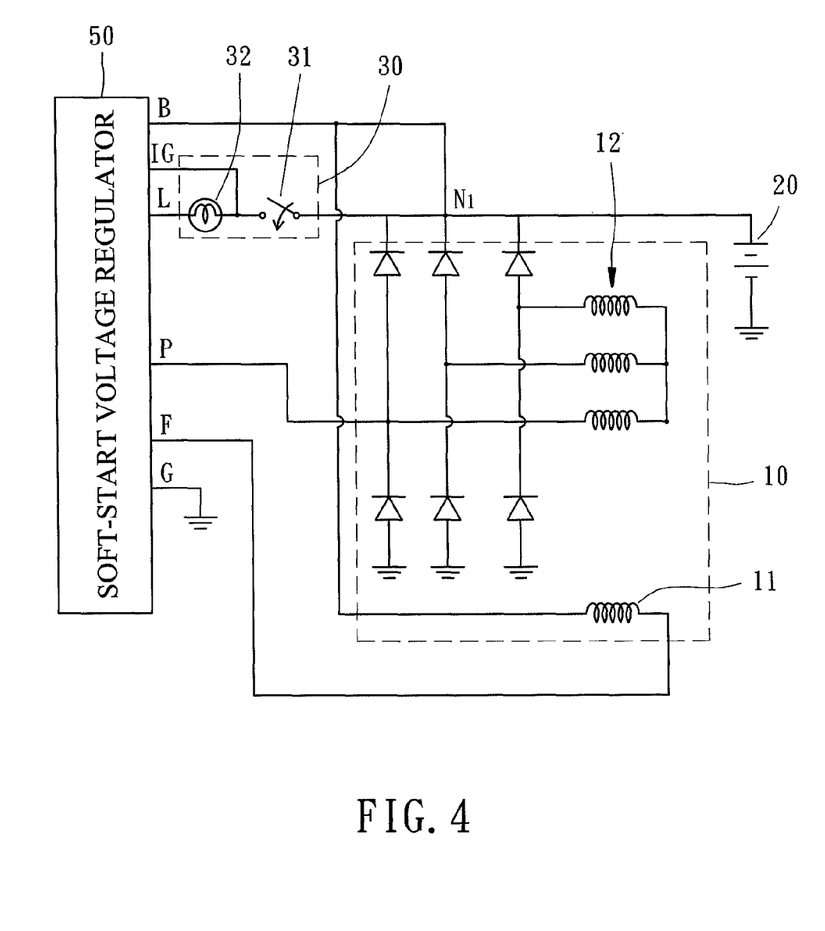
FIG. 4 is the illustrated diagram of a generator voltage regulating system in accordance with the present invention.

Referring to FIG. 4, a generator voltage regulating system in accordance with the present invention is shown. This design of generator voltage regulating system is adapted for use in a transportable vehicle, such as, car, truck, van, multipurpose vehicle, trailer, motorcycle, ship, etc. In this embodiment, the transportation vehicle is a car. The soft-start voltage regulating system comprises a generator 10, a battery 20, a starter 30, and a soft-start voltage regulator 50. The generator 10 comprises a rotor 11 and a stator 12. In actual application, the stator 12 of the generator 10 has coupled to a currentrectifier circuit for rectifying the voltage established by the generator 10. The battery 20 is coupled to the generator 10 and the starter 30 through a node N1. The soft-start voltage regulator 50 comprises six points B, IG, L, P, F and G coupled to the battery 20, the starter 30, the rotor 11 and stator 12 of the generator 10 and the earth respectively, for controlling the rotor 11 to generate a excitation so that the generator 10 can startup the voltage for car running. The starter 30 comprises a start switch 31 and an indicator 32. The start switch 31 can be a key, knob or button-based start switch. The indicator 32 can be a light-emitting device, for example, lamp bulb or LED (light-emitting diode).

Figure 5:
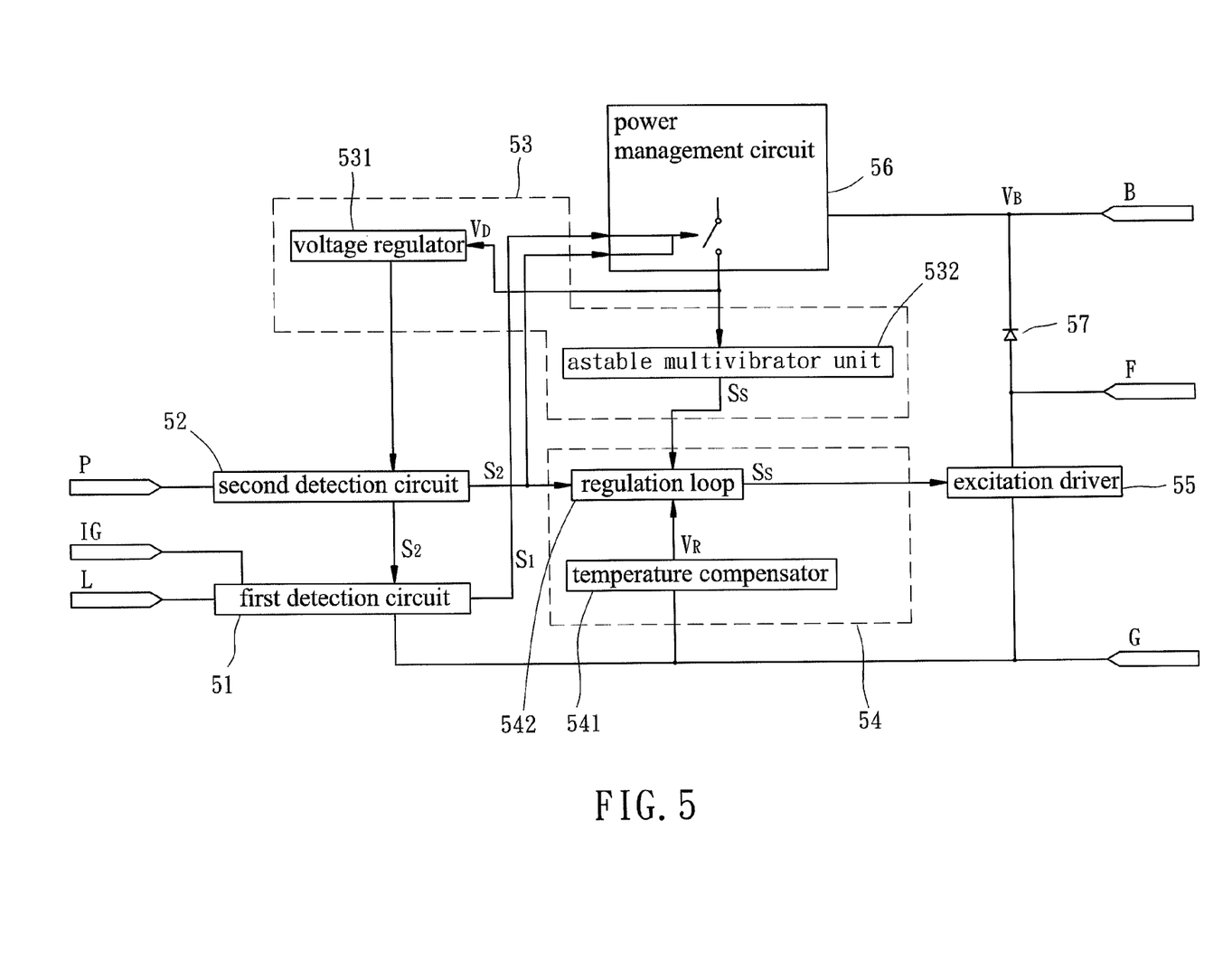
FIG. 5 is a block diagram of the soft-start voltage regulator of the generator voltage regulating system shown in FIG. 4.

FIG. 5 is a block diagram of the soft-start voltage regulator of the generator voltage regulating system shown in FIG. 4. As illustrated in FIGS. 4 and 5, the soft-start voltage regulator 50 comprises a first detection circuit 51, a second detection circuit 52, a soft-start circuit 53, a regulator circuit 54, an excitation driver 55, and a power management circuit 56.

The first detection circuit 51 is coupled to the points IG and L of the soft-start voltage regulator 50, and adapted to monitor the starter 30 and to generate a first signal $S_1$ upon start of the starter 30.

The second detection circuit 52 is coupled to the point P of the soft-start voltage regulator 50, and adapted to monitor the generator 10 and to generate a second signal $S_2$ upon a voltage established by the generator 10.

The soft-start circuit 53 comprises a voltage regulator 531, and an astable multivibrator unit 532 coupled to the voltage regulator 531. The voltage regulator 531 provides an operating voltage $V_D$. The astable multivibrator unit 532 is adapted to receive the operating voltage $V_D$, and to generate a soft-start signal $S_S$.

The regulator circuit 54 is coupled to the soft-start circuit 53.

The excitation driver 55 is coupled to the regulator circuit 54 and the points F and G.

The power management circuit 56 is coupled to the first detection circuit 51, the second detection circuit 52 and the soft-start circuit 53, and coupled to the battery 20 and the generator 10 via the point B (see point B in FIG. 4). When the power management circuit 56 receives the first signal $S_1$, the point B provides a voltage $V_B$ to the soft-start circuit 53, enabling the soft-start circuit 53 to generate the soft-start signal $S_S$, which is transmitted to the excitation driver 55 through the regulator circuit 54 for causing the generator to establish a voltage. At this time, the voltage $V_B$ at the point B is provided by the battery, the excitation driver 55 transmits the soft-start signal $S_S$ to the rotor 11 of the generator 10 for establishing a voltage. When the power management circuit 56 receives the second signal $S_2$, the soft-start circuit 53 is stopped. At this time, the soft-start circuit 53 stops from generating the soft-start signal $S_S$, however, the voltage $V_B$ at the point B is continuously provided to the regulator circuit 54 to control the excitation driver 55.

The regulator circuit 54 comprises a temperature compensator 541, and a regulation loop 542 coupled to the temperature compensator 541. The temperature compensator 541 comprises a reference voltage $V_R$. When the regulation loop 542 determines that the reference voltage $V_R$ is higher than the voltage $V_B$ at the point B, the regulation loop 542 conducts the excitation driver 55; When the regulation loop 542 determines that the reference voltage $V_R$ is lower than the voltage $V_B$ at the point B, the regulation loop 542 turns off the excitation driver 55. Thus, after establishment of a voltage of the generator 10, the generator 10 can then be controlled by the regulator 54.

With respect to the stages of starting generator in before, during and after will be explained later in combination with related circuits.

Figure 6:
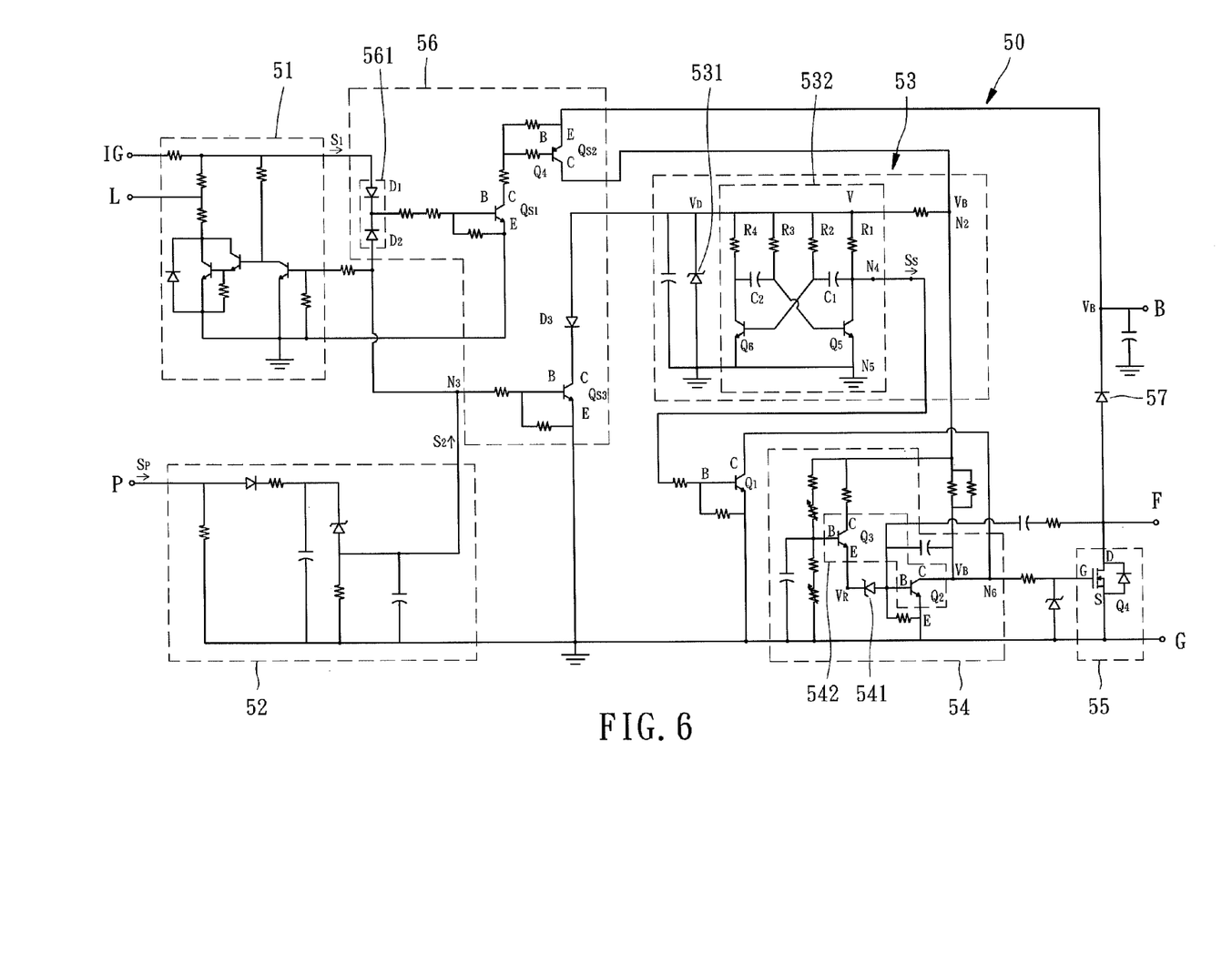
FIG. 6 is a circuit diagram of the soft-start voltage regulator of the generator voltage regulating system shown in FIG. 4.

FIG. 6 is a circuit diagram of the soft-start voltage regulator of the generator voltage regulating system shown in FIG. 4. As illustrated in FIG. 6, the power management circuit 56 comprises a switch unit 561, a first transistor $Q_{S1}$, a second transistor $Q_{S2}$ and a third transistor $Q_{S3}$. The switch unit 561 is adapted to receive the first signal $S_1$ and the second signal $S_2$, and to output one of the first and second signals $S_1$ and $S_2$. In this embodiment, the switch unit 561 comprises a first diode $D_1$ and a second diode $D_2$. The first diode $D_1$ has the P junction thereof coupled to the first detection circuit 51, and the N junction thereof coupled to the N junction of the second diode $D_2$, and the second diode $D_2$ has the P junction thereof coupled to the first detection circuit 51 and the second detection circuit 52 via a node N3. The first transistor $Q_{S1}$ has the base B thereof coupled to the N junction of the first diode $D_1$, the emitter E thereof grounded, and the collector C thereof coupled to the base B of the second transistor $Q_{S2}$. The second transistor $Q_{S2}$ has the emitter E thereof coupled to the point B, and the collector C thereof coupled to the soft-start circuit 53, the regulator circuit 54 and the power management circuit 56 via a node N2. The third transistor $Q_{S3}$ has the base B thereof coupled to the node N3, and the emitter E thereof coupled to the point G, i.e., the grounding terminal, and the collector C thereof coupled to the node N2.

The voltage regulator 531 of the soft-start circuit 53 is, for example, a Zener diode. The astable multivibrator unit 532 comprises an input coupled to the node N2, an output N4 coupled to a node N6, and a grounding end N5 grounded. The node N6 is coupled to the excitation driver 55 and the regulator circuit 54. In this embodiment, the output N4 outputs the soft-start signal $S_S$ to a transistor $Q_1$ to switch a transistor $Q_4$ on and off intermittently.

The temperature compensator 541 of the regulator circuit 54 is a Zener diode. The regulation loop 542 comprises two transistors $Q_2$ and $Q_3$. The Zener diode has two ends thereof coupled to the base B of the transistor $Q_2$ and the emitter E of the transistor $Q_3$ respectively. The transistor $Q_2$ has the collector C thereof coupled to the node N6.

The excitation driver 55 in this embodiment is a MOSFET, referenced by $Q_4$. The MOSFET transistor $Q_4$ has the drain D thereof coupled to the point F and a flyback diode 57, the gate G thereof coupled to the regulator circuit 54, and the source S thereof coupled to the point G. In practice, the excitation driver 55 can be a Darlington pair transistor circuit or other transistor circuit design.

Before startup the generator 10, the starter 30 is off, and the first transistor $Q_{S1}$ and the second transistor $Q_{S2}$ are off, and therefore the voltage at the point B, i.e., power of the battery is isolated to avoid unnecessary consumption to approach zero leakage current when the car stalled.

During the startup of generator 10, the first detection circuit 51 senses the conduction of the starter 30 and outputs the first signal $S_1$ to the switch unit 561 to conduct the first transistor $Q_{S1}$, and enabling the voltage $V_B$ at the point B to be provided to the soft-start circuit 53 through the emitter-collector E-C of the second transistor $Q_{S2}$. Thus, the voltage regulator 531 receive the voltage $V_B$ and regulate it into a stabilized operating voltage $V_D$ for causing the astable multivibrator unit 532 to oscillate and to output the soft-start signal $S_S$ to the excitation driver 55. At this time, the excitation driver 55 will be conducted to output the soft-start signal $S_S$ to the point F, enabling the rotor 11 of the generator 10 to establish a voltage.

After voltage of the generator 10 had been established, the generator 10 can provide the car with the necessary electricity. When the second detection circuit 52 sensed the voltage phase $S_P$ of the generator 10, it immediately outputs the second signal $S_2$ to the base B of the third transistor $Q_{S3}$, conducting the base-emitter B-E of the third transistor $Q_{S3}$, then, the operating voltage $V_D$ become low, and the soft-start circuit 53 been turning off. Thus, the soft-start circuit 53 is off after the generator 10 established the voltage.

Further, the second detection circuit 52 can also output the second signal $S_2$ to the switch unit 561 of the power management circuit 56, enabling the voltage $V_B$ at the point B to be provided to the regulator circuit 54 through the emitter-collector E-C of the second transistor $Q_{S2}$. At this time, the regulator circuit 54 starts working. The two transistors $Q_2$ and $Q_3$ of the regulation loop 542 can receive the voltage $V_B$ front the point B to conduct the transistor $Q_3$, and the temperature compensator 541 can establish the reference voltage $V_R$. The voltage $V_B$ is higher than the reference voltage $V_R$ at this time, therefore the transistor $Q_2$ is conducted and the gate-source G-S of the MOSFET transistor $Q_4$ to be short-circuited and become off. Thus, the excitation driver 56 is off. Further, the voltage $V_B$ is gradually lowered with the decrease of the electric power of the rotor, so that the voltage $V_B$ becomes lower than the reference voltage $V_R$, thus the transistor $Q_2$ to be switched off and the MOSFET $Q_4$ to be conducted again to excite the rotor 11 of the generator 10.

The soft-start voltage regulator 50 further comprises the flyback diode 57 that is coupled to the point B and the excitation driver 55. When the MOSFET transistor $Q_4$ is off, the rotor 11 of the generator 10 releases the power via the flyback diode 57.

More particularly, the invention still can provide the voltage $V_B$ to the power management circuit 56, the regulator circuit 54 and the excitation driver 55 even if the point IG or L is dropped out of circuit suddenly during the car running.

Figure 7:
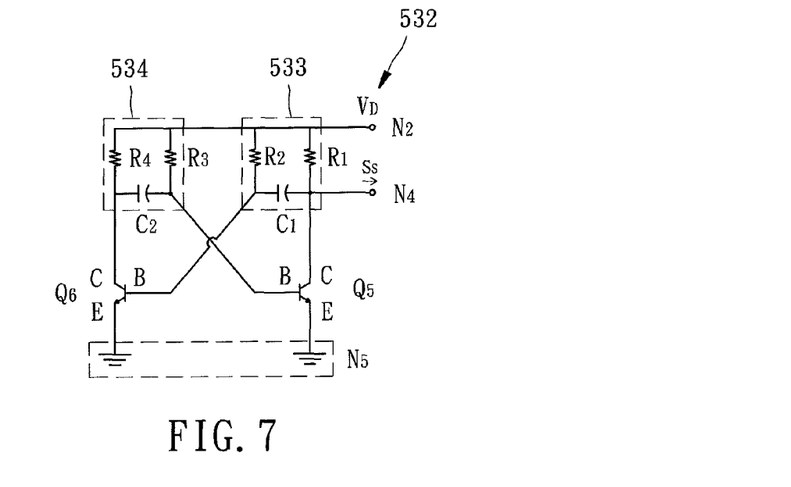
FIG. 7 is a circuit diagram of the astable multivibrator unit of the soft-start voltage regulator shown in FIG. 5.

FIG. 7 is a circuit diagram of the astable multivibrator unit of the soft-start voltage regulator shown in FIG. 5. As illustrated, the astable multivibrator unit 532 comprises two transistors $Q_5$ and $Q_6$, a first resistor-capacitor circuit 533 and a second resistor-capacitor circuit 534. The emitters E of the transistors $Q_5$ and $Q_6$ are grounded (node N5). The transistor $Q_5$ has the base B thereof coupled to the second resistor-capacitor circuit 534, and the collector C thereof coupled to the node N4. The transistor $Q_6$ has the base B thereof coupled to the first resistor-capacitor circuit 533, and the collector C thereof coupled to the second resistor-capacitor circuit 534. The first resistor-capacitor circuit 533 and the second resistor-capacitor circuit 534 are coupled to the node N2 for receiving the operating voltage $V_D$. Thus, the astable multivibrator unit 532 oscillate and output the soft-start signal $S_S$, so as to start the pre-excitation soft start. More particularly, the present invention can control the duty cycle of the soft-start signal with setting values of the capacitance or the resistance of the first and second resistor-capacitor circuits 533 and 534. Thus, the invention can obtain the duty cycle in the range of 12~35% by means of verify the setting values of passive components, i.e. capacitors $C_1$~$C_2$, or resistors $R_1$~$R_4$ of the first and second resistor-capacitor circuits 533 and 534.

Figure 8:
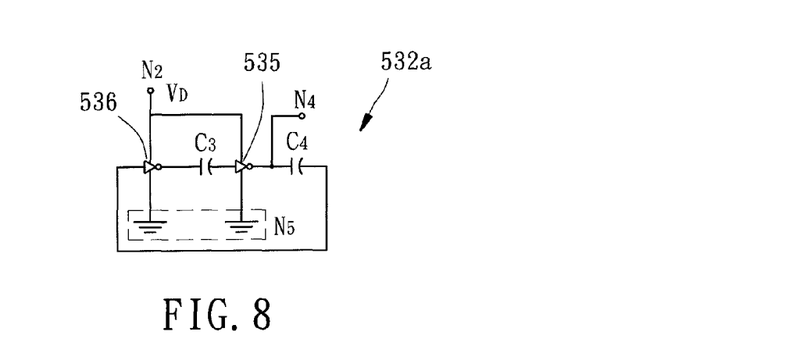
FIG. 8 is a circuit diagram of another astable multivibrator unit in accordance with the present invention.
Figure 9:
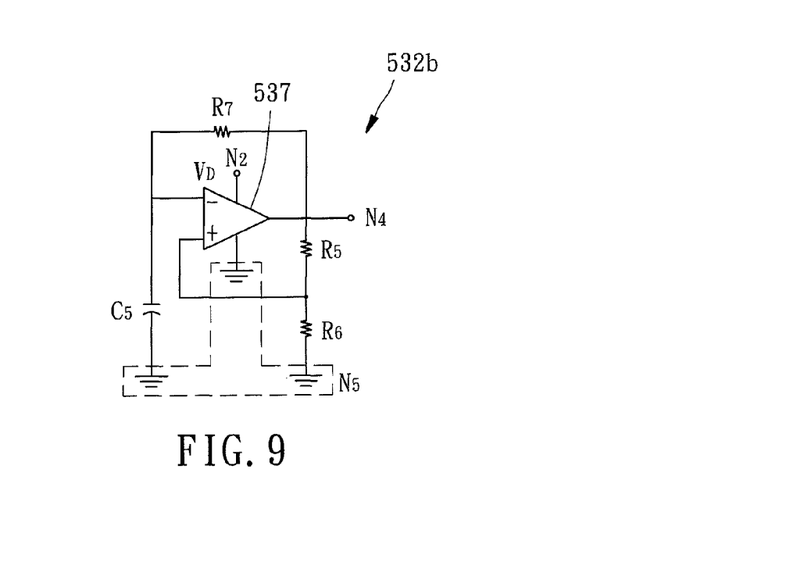
FIG. 9 is a circuit diagram of another astable multivibrator unit in accordance with the present invention.

FIGS. 8 and 9 illustrate other two astable multivibrator unit that can replace the astable multivibrator unit shown in FIG. 6.

As shown in FIG. 8, the astable multivibrator unit 532a comprises two NOT gate 535 and 536, and two capacitors $C_3$ and $C_4$. Wherein one capacitor $C_3$ is coupled in series to the input of one NOT gate 535 and the output of the other NOT gate 536; the other capacitor $C_4$ is coupled in series to the output of one NOT gate 535 and the input of the other NOT gate 536; the two NOT gate 535 and 536 are respectively coupled to the nodes N2 and N5 for receiving the operating voltage $V_D$ and grounding; the NOT gate 535 has the output thereof coupled to the node N4, i.e., the excitation driver 55.

As shown in FIG. 9, the astable multivibrator unit 532b comprises an operational amplifier 537, a first resistor $R_5$, a second resistor $R_6$, a third resistor $R_7$ and a capacitor $C_5$, wherein the operational amplifier 537 is coupled to the nodes N2 and N5 for receiving the operating voltage $V_D$ and grounding; the first resistor $R_5$ is coupled to the non-inverting input $V_+$ and the output of the operational amplifier 537; the second resistor $R_6$ is coupled between the non-inverting input of the operational amplifier 537 and the node N5; the third resistor $R_7$ is coupled between the inverting input $V_-$ and output of the operational amplifier 537; the capacitor $C_5$ is coupled between the inverting input of the operational amplifier 537 and the node N5; the operational amplifier 537 has the output thereof coupled to the excitation driver 55, i.e., the node N4.

The aforesaid two astable multivibrator units 532a and 532b provide variable duty cycle of the soft-start signal by changing the capacitance value or resistance value of those passive components.

Figure 10:
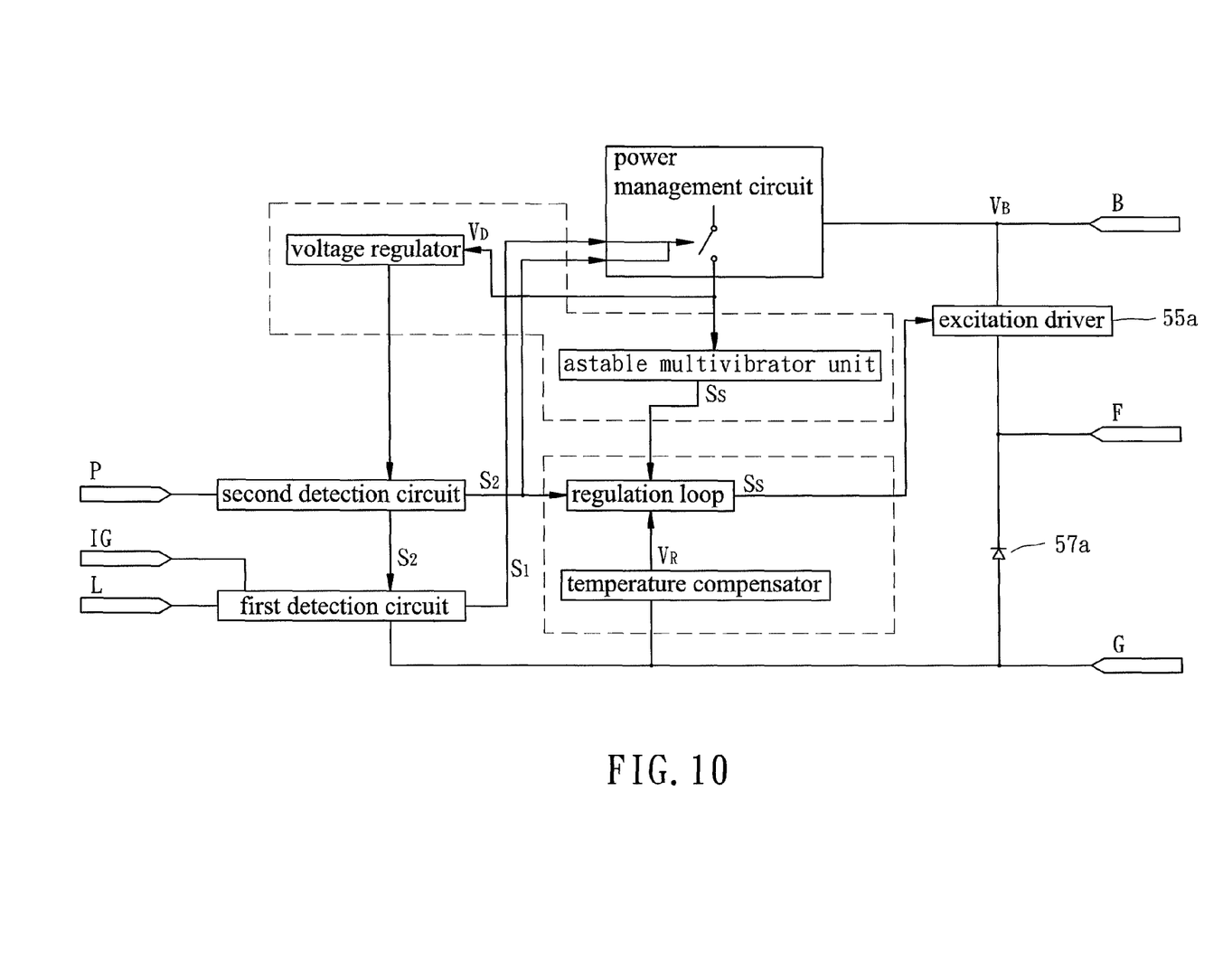
FIG. 10 is a block diagram of another soft-start voltage regulator in accordance with the present invention.

FIG. 10 is a block diagram of another soft-start voltage regulator in accordance with the present invention. Only the differences between the embodiment shown in FIG. 5 and the embodiment shown in FIG. 10 and the connection thereof would be described in detail as follows, the similarities would not be described again. As shown in FIG. 10, the excitation driver 55a is coupled between the points B and F, and the flyback diode 57a is coupled between the points F and G.

Compared to the prior art, the present invention adopts discrete components, i.e., the combination of active components and passive components. This arrangement of discrete components achieves zero leakage current. Further, by means of regulating the passive components, a flexible duty cycle design in the range of 12~35% can be obtained to satisfy clients' different demands, reducing the cost and widening the application range. Further, the soft-start voltage regulator of the present invention can be used in harsh environments, such as the maximum tolerated temperature up to 150 degrees Celsius, which is better than the integrated circuit withstand temperature.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A soft-start circuit, comprising a voltage regulator and an astable multivibrator unit coupled to said voltage regulator, said astable multivibrator unit comprising an input, an output and a grounding end, said voltage regulator being adapted to provide an operating voltage, said astable multivibrator unit being adapted to receive said operating voltage and to oscillating a soft-start signal for output through said output;

wherein said astable multivibrator unit comprises two transistors, a first resistor-capacitor circuit and a second resistor-capacitor circuit, said two transistors having the emitters thereof respectively grounded, one said transistor having the base thereof coupled to said second resistor-capacitor circuit, said transistors having the collectors thereof coupled to said first resistor-capacitor circuit and the output of said astable multivibrator unit, the other said transistor having the base thereof coupled to said first resistor-capacitor circuit and the collector thereof coupled to said second resistor-capacitor circuit, said first resistor-capacitor circuit and said second resistor-capacitor circuit being adapted to receive said operating voltage.

2. A soft-start circuit, comprising a voltage regulator and an astable multivibrator unit coupled to said voltage regulator, said astable multivibrator unit comprising an input, an output and a grounding end, said voltage regulator being adapted to provide an operating voltage, said astable multivibrator unit being adapted to receive said operating voltage and to oscillating a soft-start signal for output through said output;

wherein said astable multivibrator unit comprises two NOT gates and two capacitors, said two NOT gates being adapted for receiving said operating voltage, one said capacitor being coupled in series to the input of one said NOT gate and the output of the other said NOT gate, the other said capacitor being coupled to the output of one said NOT gate and the input of the other said NOT gate, said astable multivibrator unit having the output thereof coupled to the output of one said NOT gate.

3. A soft-start circuit, comprising a voltage regulator and an astable multivibrator unit coupled to said voltage regulator, said astable multivibrator unit comprising an input, an output and a grounding end, said voltage regulator being adapted to provide an operating voltage, said astable multivibrator unit being adapted to receive said operating voltage and to oscillating a soft-start signal for output through said output;

wherein said astable multivibrator unit comprises an operational amplifier, a first resistor, a second resistor, a third resistor and a capacitor, said operational amplifier being adapted to receive said operating voltage, said first resistor being respectively coupled to the non-inverting input and non-inverting output of said operational amplifier, said second resistor being coupled to the non-inverting input of said operational amplifier and grounded, said third resistor being coupled to the inverting input and inverting output of said operational amplifier, said capacitor being coupled to the inverting input of said operational amplifier and grounded, said operational amplifier having the output thereof coupled to the output of said astable multivibrator unit.

4. A soft-start voltage regulator coupled to a generator, a battery and a starter, said soft-start voltage regulator comprising:

a soft-start circuit comprising a voltage regulator and an astable multivibrator unit coupled to said voltage regulator, said astable multivibrator unit comprising an input, an output and a grounding end, said voltage regulator being adapted to provide an operating voltage, said astable multivibrator unit being adapted to receive said operating voltage and to oscillating a soft-start signal for output through said output;

a first detection circuit adapted for monitoring said starter and to generate a first signal when said starter is started;

a second detection circuit adapted for monitoring said generator and to generate a second signal when said generator establishes a voltage;

a regulator circuit coupled to said soft-start circuit;

an excitation driver coupled to said regulator circuit; and a power management circuit coupled to said first detection circuit, said second detection circuit and said soft-start circuit, said power management circuit comprising a power supply terminal coupled to said battery and said generator;

wherein when said power management circuit receives said first signal, said power supply terminal provides a voltage to said soft-start circuit for enabling said soft-start circuit to generate said soft-start signal, which is transmitted through said regulator circuit to said excitation driver, causing said generator to establish a voltage; when said power management circuit receives said second signal, said power management circuit turns off said soft-start circuit, and said power supply terminal provides the voltage to said regulator circuit to control said excitation driver.

5. The soft-start voltage regulator as claimed in claim 4, wherein said regulator circuit comprises a temperature compensator and a regulation loop coupled to said temperature compensator, said temperature compensator comprising a reference voltage; when said regulation loop determines said reference voltage to be higher than the voltage of said power supply terminal of said power management circuit, said regulation loop conducts said excitation driver; when said regulation loop determines said reference voltage to be lower than the voltage of said power supply terminal of said power management circuit, said regulation loop shuts off said excitation driver.

6. The soft-start voltage regulator as claimed in claim 4, wherein said power management circuit comprises a switch unit, a first transistor, a second transistor and a third transistor, said switch unit being coupled to said first detection circuit and said second detection circuit and adapted to receive said first signal and said second signal, said first transistor having the base thereof coupled to said switch unit, the emitter thereof grounded and the collector thereof coupled to the base of said second transistor, said second transistor having the emitter thereof adapted for receiving the voltage of said battery and the collector thereof coupled to said soft-start circuit and said regulator circuit, said third transistor having the base thereof coupled to said second detection circuit for receiving said second signal, the emitter thereof grounded and the collector thereof coupled to said soft-start circuit.

7. The soft-start voltage regulator as claimed in claim 4, further comprising a flyback diode coupled to said excitation driver and said power management circuit.

8. The soft-start voltage regulator as claimed in claim 4, further comprising a flyback diode coupled to said excitation driver.

9. The soft-start voltage regulator as claimed in claim 4, wherein said astable multivibrator unit of said soft-start circuit comprises two transistors, a first resistor-capacitor circuit and a second resistor-capacitor circuit, said two transistors having the emitters thereof respectively grounded, one said transistor having the base thereof coupled to said second resistor-capacitor circuit, said transistors having the collectors thereof coupled to said first resistor-capacitor circuit and the output of said astable multivibrator unit, the other said transistor having the base thereof coupled to said first resistor-capacitor circuit and the collector thereof coupled to said second resistor-capacitor circuit, said first resistor-capacitor circuit and said second resistor-capacitor circuit being adapted to receive said operating voltage.

10. The soft-start voltage regulator as claimed in claim 4, wherein said astable multivibrator unit of said soft-start circuit comprises two NOT gates and two capacitors, said two NOT gates being adapted for receiving said operating voltage, one said capacitor being coupled in series to the input of one said NOT gate and the output of the other said NOT gate, the other said capacitor being coupled to the output of one said NOT gate and the input of the other said NOT gate, said astable multivibrator unit having the output thereof coupled to the output of one said NOT gate.

11. The soft-start voltage regulator as claimed in claim 4, wherein said astable multivibrator unit of said soft-start circuit comprises an operational amplifier, a first resistor, a second resistor, a third resistor and a capacitor, said operational amplifier being adapted to receive said operating voltage, said first resistor being respectively coupled to the non-inverting input and non-inverting output of said operational amplifier, said second resistor being coupled to the non-inverting input of said operational amplifier and grounded, said third resistor being coupled to the inverting input and inverting output of said operational amplifier, said capacitor being coupled to the inverting input of said operational amplifier and grounded, said operational amplifier having the output thereof coupled to the output of said astable multivibrator unit.

12. A generator voltage regulating system for use in a transportation vehicle, comprising at least a soft-start voltage regulator as claimed in claim 4.

13. The generator voltage regulating system as claimed in claim 12, wherein said regulator circuit of said soft-start voltage regulator comprises a temperature compensator and a regulation loop coupled to said temperature compensator, said temperature compensator comprising a reference voltage; when said regulation loop determines said reference voltage to be higher than the voltage of said power supply terminal of said power management circuit, said regulation loop conducts said excitation driver; when said regulation loop determines said reference voltage to be lower than the voltage of said power supply terminal of said power management circuit, said regulation loop shuts off said excitation driver.

14. The generator voltage regulating system as claimed in claim 12, wherein said power management circuit of said soft-start voltage regulator comprises a switch unit, a first transistor, a second transistor and a third transistor, said switch unit being coupled to said first detection circuit and said second detection circuit and adapted to receive said first signal and said second signal, said first transistor having the base thereof coupled to said switch unit, the emitter thereof grounded and the collector thereof coupled to the base of said second transistor, said second transistor having the emitter thereof adapted for receiving the voltage of said battery and the collector thereof coupled to said soft-start circuit and said regulator circuit, said third transistor having the base thereof coupled to said second detection circuit for receiving said second signal, the emitter thereof grounded and the collector thereof coupled to said soft-start circuit.

15. The generator voltage regulating system as claimed in claim 12, wherein said soft-start voltage regulator further comprising a flyback diode coupled to said excitation driver and said power management circuit.

16. The generator voltage regulating system as claimed in claim 12, wherein said soft-start voltage regulator further comprising a flyback diode coupled to said excitation driver.

17. The generator voltage regulating system as claimed in claim 12, wherein said astable multivibrator unit of said soft-start circuit of said soft-start voltage regulator comprises two transistors, a first resistor-capacitor circuit and a second resistor-capacitor circuit, said two transistors having the emitters thereof respectively grounded, one said transistor having the base thereof coupled to said second resistor-capacitor circuit, said transistors having the collectors thereof coupled to said first resistor-capacitor circuit and the output of said astable multivibrator unit, the other said transistor having the base thereof coupled to said first resistor-capacitor circuit and the collector thereof coupled to said second resistor-capacitor circuit, said first resistor-capacitor circuit and said second resistor-capacitor circuit being adapted to receive said operating voltage.

18. The generator voltage regulating system as claimed in claim 12, wherein said astable multivibrator unit of said soft-start circuit of said soft-start voltage regulator comprises two NOT gates and two capacitors, said two NOT gates being adapted for receiving said operating voltage, one said capacitor being coupled in series to the input of one said NOT gate and the output of the other said NOT gate, the other said capacitor being coupled to the output of one said NOT gate and the input of the other said NOT gate, said astable multivibrator unit having the output thereof coupled to the output of one said NOT gate.

19. The generator voltage regulating system as claimed in claim 12, wherein said astable multivibrator unit of said soft-start circuit of said soft-start voltage regulator comprises an operational amplifier, a first resistor, a second resistor, a third resistor and a capacitor, said operational amplifier being adapted to receive said operating voltage, said first resistor being respectively coupled to the non-inverting input and non-inverting output of said operational amplifier, said second resistor being coupled to the non-inverting input of said operational amplifier and grounded, said third resistor being coupled to the inverting input and inverting output of said operational amplifier, said capacitor being coupled to the inverting input of said operational amplifier and grounded, said operational amplifier having the output thereof coupled to the output of said astable multivibrator unit.

* * * * *